United States Patent
Jeon et al.

(10) Patent No.: US 7,852,738 B2
(45) Date of Patent: Dec. 14, 2010

(54) METHOD OF IMPROVING SENSITIVITY OF ELECTRIC FIELD SENSOR, STORAGE APPARATUS INCLUDING ELECTRIC FIELD SENSOR, AND METHOD OF REPRODUCING INFORMATION OF THE STORAGE APPARATUS

(75) Inventors: Dae-young Jeon, Mokpo-si (KR); Dong-ki Min, Seoul (KR); Hyoung-soo Ko, Seoul (KR); Seung-bum Hong, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 527 days.

(21) Appl. No.: 11/965,836

(22) Filed: Dec. 28, 2007

(65) Prior Publication Data
US 2009/0034405 A1 Feb. 5, 2009

(30) Foreign Application Priority Data
Jul. 30, 2007 (KR) .................... 10-2007-0076432

(51) Int. Cl.
*G11B 9/00* (2006.01)

(52) U.S. Cl. ..................................... 369/126
(58) Field of Classification Search ............. None
See application file for complete search history.

(56) References Cited

U.S. PATENT DOCUMENTS

| | | | | |
|---|---|---|---|---|
| 4,707,669 A | * | 11/1987 | Mekata et al. | ............. 331/99 |
| 6,477,132 B1 | * | 11/2002 | Azuma et al. | ............. 369/126 |
| 6,515,957 B1 | * | 2/2003 | Newns et al. | ............. 369/126 |
| 2005/0135200 A1 | * | 6/2005 | Mejia et al. | ............. 369/13.01 |

* cited by examiner

*Primary Examiner*—Christopher R Lamb
(74) *Attorney, Agent, or Firm*—Sughrue Mion, PLLC

(57) ABSTRACT

A storage apparatus includes a ferroelectric recording medium, an electric field sensor including a source region, a drain region and a resistance region electrically connecting the source region to the drain region and having a resistance, which varies according to an intensity of an electric field due to a polarization voltage of an electric domain of the recording medium, a voltage applying unit applying a drain voltage between the source region and the drain region, and a reproducing signal detection unit including at least one negative resistor installed in an electric circuit connecting the drain region to the voltage applying unit, and detecting a change in a voltage between the drain region and the at least one negative resistor.

12 Claims, 11 Drawing Sheets

METHOD OF IMPROVING SENSITIVITY OF ELECTRIC FIELD SENSOR, STORAGE APPARATUS INCLUDING ELECTRIC FIELD SENSOR, AND METHOD OF REPRODUCING INFORMATION OF THE STORAGE APPARATUS

CROSS-REFERENCE TO RELATED PATENT APPLICATION

This application claims priority from Korean Patent Application No. 10-2007-0076432, filed on Jul. 30, 2007, in the Korean Intellectual Property Office, the disclosure of which is incorporated herein in its entirety by reference.

BACKGROUND OF THE INVENTION

1. Field of the Invention

The present invention relates to a storage apparatus and a method of reproducing information of the storage apparatus, and more particularly, to a storage apparatus and a method of reproducing information of the storage apparatus, in which information recorded in a ferroelectric recording medium is read using an electric field sensor.

2. Description of the Related Art

A Hard Disk Drive (HDD), which is a primary storage device of a computer, operates by spinning a data-recording medium and suspending a read/write head over the data-recording medium in order to read and write data. A conventional HDD normally uses a magnetic field to create a plurality of magnetic domains magnetized in a first direction on the magnetic recording medium or in a second direction opposite to the first direction. The magnetic domains magnetized in the first and second directions correspond to data '0' and data '1', respectively.

HDDs employing this magnetic writing method have undergone tremendous increases in terms of their writing densities over the last few decades. Thus, horizontal magnetic writing on HDDs can produce approximately 100 Gb/in$^2$ in terms of recording density, and vertical magnetic writing on HDDs can produce approximately 500 Gb/in$^2$ in terms of recording density. However, since it is difficult for the magnetic read/write head to form a strong localized magnetic field, the increase in recording density is limited.

Recently, research has been conducted on a ferroelectric medium (on which data is written using electric fields) and a corresponding read/write head (hereinafter referred to as electric field read/write head). An electric field writing method uses an electric field to form electric domains polarized in a first direction or in a second direction opposite to the first direction on a ferroelectric surface. Electric domains polarized in the first and second directions correspond to data '0' and data '1', respectively. According to the polarization direction of an electric domain, the resistance of the electric field read/write head above that domain changes, so that an amount of a current flowing between a source electrode and a drain electrode of the electric field read/write head may change. By detecting the change of the current amount, the data written in the electric domain can be discerned. According to electric field reading/writing, a high recording density of 1 Tb/in$^2$ or more can be achieved.

The electric field read/write head applies an electric field leading to polarization of a recording medium during recording, and detects the variation of the electric field due to a polarization voltage of an electric domain of the recording medium during reproduction. The electric field read/write head functions as an electric field sensor having a channel structure of an electric field effect transistor during reproduction. To realize a more efficient and large-scale storage apparatus, the sensitivity of the electric field sensor should be improved.

SUMMARY OF THE INVENTION

The present invention provides a method of improving the sensitivity of an electric field sensor, a storage apparatus having improved read sensitivity and a method of reproducing information of the storage apparatus.

According to an aspect of the present invention, there is provided a method of improving the sensitivity of an electric field sensor including a source region, a drain region and a resistance region electrically connecting the source region to the drain region and having a resistance, which varies according to an intensity of an electric field, and detecting a change in an electric field by measuring a change in a drain current flowing through the resistance region, wherein the measuring a change in the drain current includes: passing the drain current through at least one negative resistor; and detecting a change in a voltage between the drain region and the at least one negative resistor.

A plurality of tunnel diodes, which are connected in series and/or parallel, may be used as negative resistors. The tunnel diodes may be connected in series and/or in parallel so that a negative resistance region of a load line of the tunnel diodes has a similar gradient to a gradient of a linear region of a curve of drain current with respect to the drain voltage of the electric field sensor and the negative resistance region and the linear region cross each other.

According to another aspect of the present invention, there is provided a storage apparatus including: a ferroelectric recording medium; an electric field sensor including a source region, a drain region and a resistance region electrically connecting the source region to the drain region and having resistance, which varies according to intensity of an electric field due to a polarization voltage of an electric domain of the ferroelectric recording medium; a voltage applying unit applying a drain voltage between the source region and the drain region; and a reproducing signal detection unit including at least one negative resistor installed in an electric circuit connecting the drain region to the voltage applying unit, and detecting a change in a voltage between the drain region and the at least one negative resistor.

The negative resistor may be a tunnel diode.

The reproducing signal detection unit may include a plurality of tunnel diodes connected in series and/or in parallel. The tunnel diodes may be connected in series and/or in parallel so that a negative resistance region of a load line of the tunnel diodes has a similar gradient to a gradient of a linear region of a curve of drain current with respect to the drain voltage of the electric field sensor and the negative resistance region and the linear region cross each other.

The electric field sensor may further include a writing electrode which is disposed on the resistance region, wherein an insulating layer is disposed between the writing electrode and the resistance region, and to which a voltage, of which the absolute value is equal to or greater than a threshold voltage, is applied, and thus information is recorded and reproduced.

According to another aspect of the present invention, there is provided a method of reproducing information of a storage apparatus, the storage apparatus including: a ferroelectric recording medium; an electric field sensor including a source region, a drain region and a resistance region electrically connecting the source region to the drain region and having a resistance, which varies according to an intensity of an electric field due to a polarization voltage of an electric domain of the recording medium; and a voltage applying unit applying a drain voltage between the source region and the drain region, wherein the method may include: installing at least one negative resistor in an electric circuit connecting the drain region to the voltage applying unit to pass an output current of the electric field sensor through the at least one negative resistor; and detecting a change in a voltage between the drain region and the at least one negative resistor to obtain a reproducing signal.

A plurality of tunnel diodes, which are connected in series and/or parallel, may be used as the negative resistor.

The tunnel diodes may be connected in series and/or in parallel so that a negative resistance region of a load line of the tunnel diodes has a similar gradient to a gradient of a linear region of a curve of drain current with respect to the drain voltage of the electric field sensor and the negative resistance region and the linear region cross each other.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Figure 1:
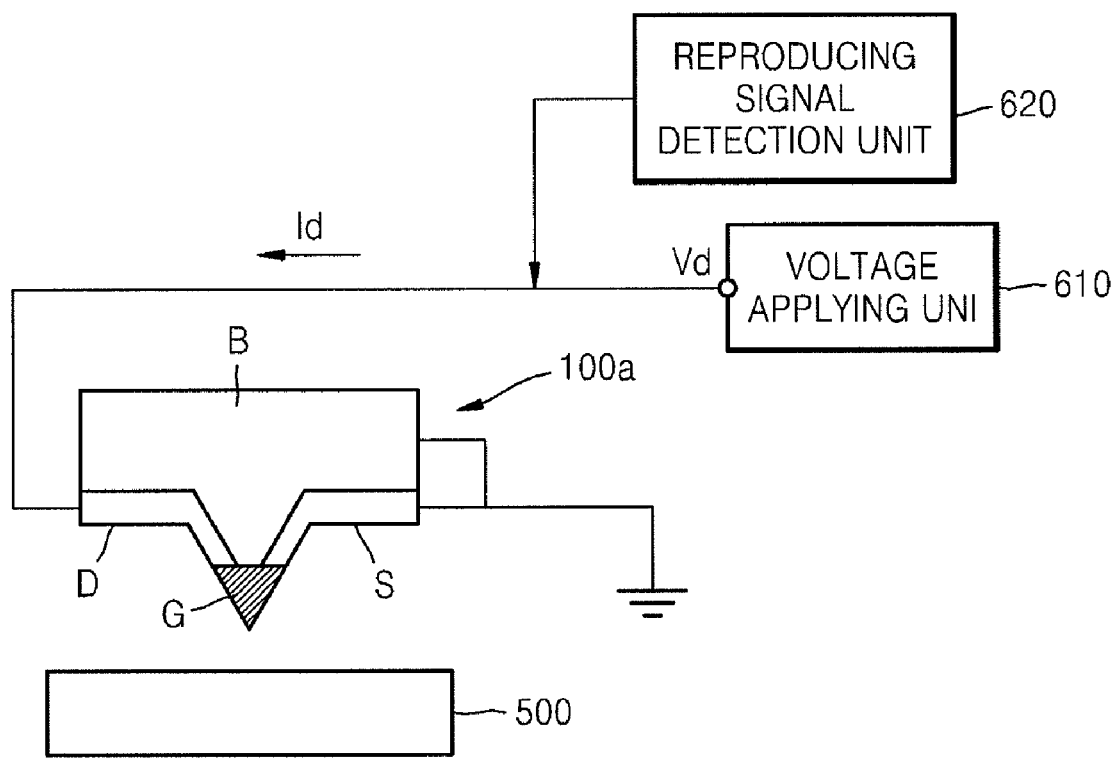
FIG. 1 is a structure view of a storage apparatus according to an exemplary embodiment of the present invention.

Hereinafter, a method of increasing the sensitivity of an electric field sensor, a storage apparatus having increased read sensitivity and a method of reproducing information of the storage apparatus will be described. In the drawings, the thickness of layers and region are exaggerated for clarity. The same reference numerals in the drawings denote the same element.

FIG. 1 is a structure view of a storage apparatus according to an exemplary embodiment of the present invention. The storage apparatus includes an electric field sensor 100a of a resistance probe type. A resistance region G, a source region S and a drain region D are disposed on a body B of the electric field sensor 100a, wherein the resistance region G is a region doped with low concentration, and the source region S and the drain region D may be disposed on either side of the resistance region G, and are each a region doped with high concentration. When the body B is a p type semiconductor, the resistance region G is an n– type region, and the source region S and the drain region D are each an n+ type region. When the body B is an n type semiconductor, the resistance region G is a p– type region, and the source region S and the drain region D are each a p+ type region. The resistance region G faces a recording medium 500. The electric field sensor 100a moves with respect to the recording medium 500.

Figure 2:
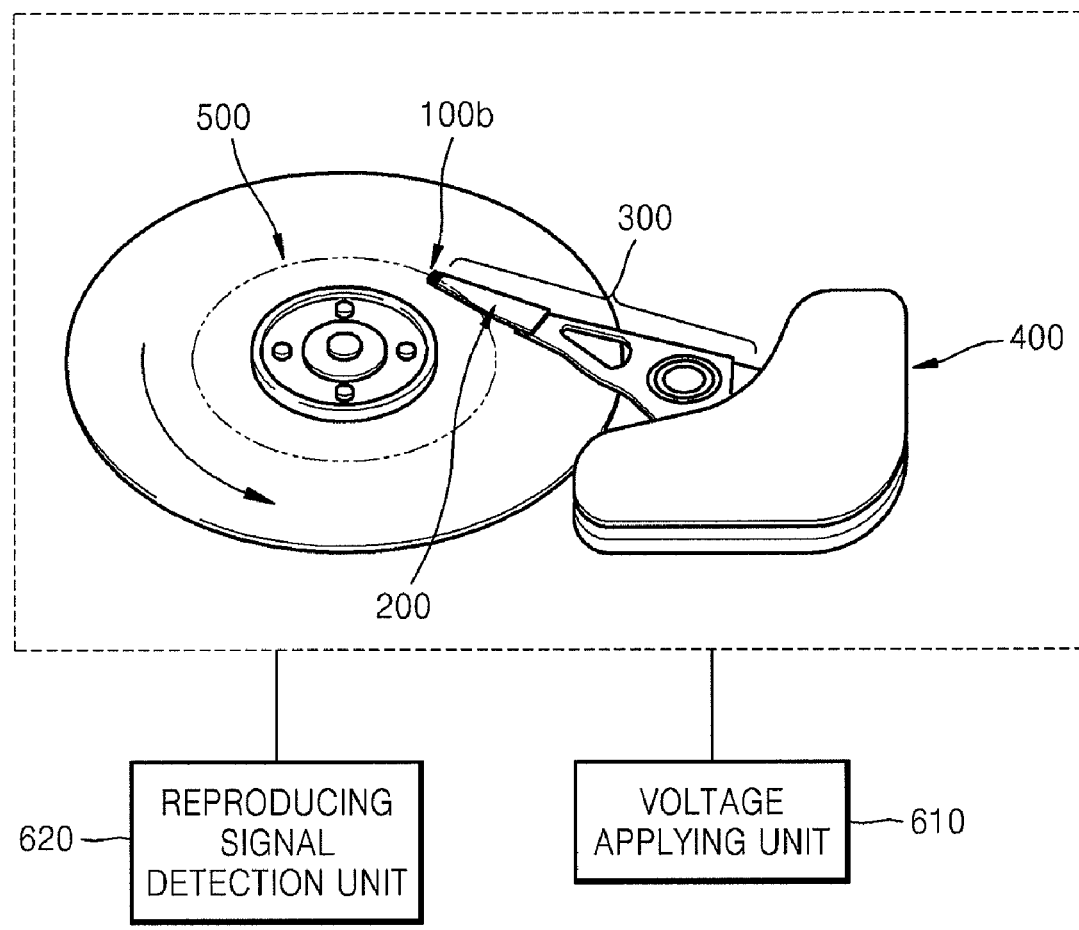
FIG. 2 is a schematic structure view of a storage apparatus according to another exemplary embodiment of the present invention.
Figure 3:
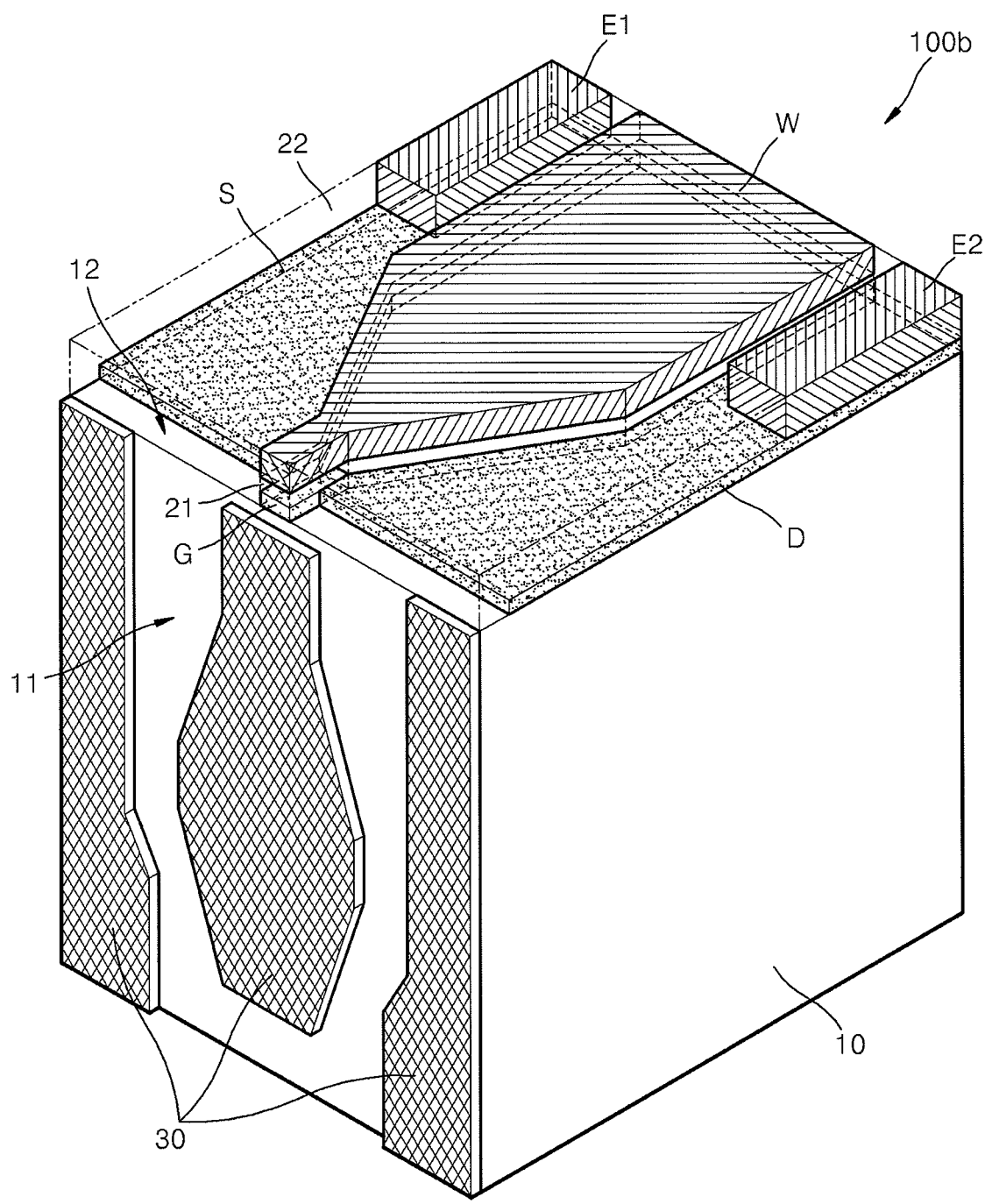
FIG. 3 is a perspective view of an electric field sensor used in the storage apparatus of FIG. 2, according to an exemplary embodiment of the present invention.

FIG. 2 is a schematic structure view of a storage apparatus according to another exemplary embodiment of the present invention. FIG. 3 is a perspective view of an electric field sensor used in the storage apparatus of FIG. 2, according to an exemplary embodiment of the present invention. A driving system of the storage apparatus is the same as that of a conventional hard disk drive (HDD). However, a magnetic recording medium of the conventional HDD can be replaced with a ferroelectric recording medium, and a magnetic recording-reproducing head of the conventional HDD can be replaced with an electric field sensor 100b of a slider type.

Referring to FIG. 2, the recording medium 500 is of a rotating disk-type. The electric field sensor 100b of FIG. 3 is attached to a suspension 200 constituting an end of the swing arm 300, which is rotated by a voice coil motor 400. Then, the electric field sensor 100b floats above a surface of the recording medium 500 due to an air bearing effect.

Referring to FIG. 3, the electric field sensor 100b includes a semiconductor substrate 10 with a first surface 11 facing the surface of the recording medium 500, and a second surface 12 contacting the first surface 11. The semiconductor substrate 10 may be formed of p type or n type semiconductor material. The first surface 11 and the second surface 12 are perpendicular to each other. A resistance region G, a source region S and a drain region D are disposed on the semiconductor substrate 10, wherein the resistance region G is a region doped with low concentration, and the source region S and the drain region D are respectively disposed on either side of the resistance region G, and are each a region doped with high concentration. A source electrode E1 and a drain electrode E2 are electrically connected to the source region S and the drain region D, respectively. When the semiconductor substrate 10 is a p type semiconductor, the resistance region G is an n– type region, and the source region S and the drain region D are each an n+ type region. When the semiconductor substrate 10 is an n type semiconductor, the resistance region G is a p– type region, and the source region S and the drain region D are each a p+ type region. When the electric field sensor 100b has a writing function, an insulating layer 21 is formed on the resistance region G, and a gate electrode W is formed on the insulating layer 21. The gate electrode W is a writing electrode. Hereinafter, the gate electrode W will be referred to as a writing electrode W. An insulating layer 22 is formed on portions of the source region S and the drain region D, which are exposed to the outside.

An air bearing surface (ABS) pattern 30 may be formed on the first surface 11 of the semiconductor substrate 10. The ABS pattern 30 functions so that the electric field sensor 100b including the ABS pattern 30 formed thereon may float above the surface of the recording medium 500.

The recording medium 500 is a ferroelectric recording medium. Although not illustrated, the recording medium 500 is configured with a structure in which a lower electrode and a ferroelectric layer are sequentially formed on a substrate. The substrate may be formed of Si, glass or the like. The lower electrode may be formed of an electrode material that is used in a semiconductor memory device, and may be formed of a metal (e.g., Pt, Al, Au, Ag, Cu or the like) or metal oxide (e.g., SrRuO3, (La,Sr) CoO or the like). The lower electrode is also grounded. The ferroelectric layer may be formed of a ferroelectric material (e.g., PZT(PbZrxTi1-xO3), PbTiO3, PbZrO3, SrBi2Ta2O9(SBT), KNbO3, LiTaO3, LiNbO3 or the like) A passivation layer may be further formed on the ferroelectric layer. The passivation layer may be formed of diamond like carbon (DLC) together with a lubricant that is used on a surface of a common HDD, and may be formed of any one of the DLC and the lubricant.

Hereinafter, a principle of reproducing information from the recording medium 500 will be described with reference to FIGS. 1 through 3.

A voltage applying unit 610 applies a drain voltage Vd between the source region S and the drain region D. The resistance region G functions as a channel through which a current flows between the source region S and the drain region D. According to an electric field applied to the resistance region G, the resistance of the resistance region G is changed. Then, the amount of a drain current Id, which flows from the source region S to the drain region D, is changed. The reproducing signal detection unit 620 detects the variation amount of the drain current Id. Hereinafter, slider type electric field sensors 100a and 100b will be referred to as an electric field sensor 100.

When the source region S and the drain region D of the electric field sensor 100 are each an n+ region, and the resistance region G is an n− region, if an electric domain of the recording medium 500 facing the resistance region G is polarized in a first polarization direction, and thus a surface charge of the recording medium 500 is negative (−), the electron density of the resistance region G decreases, and thus the resistance of the resistance region G is increased. Then, a current amount, which flows from the source region S to the drain region D through the resistance region G, is decreased. On the other hand, when an electric domain of the recording medium 500 facing the resistance region G is polarized in a second polarization direction, and thus surface charge of the recording medium 500 is positive (+), the electric density of the resistance region G is increased, and thus the resistance of the resistance region G is reduced. Then, a current amount, which flows from the source region S to the drain region D through the resistance region G, is increased. The reproducing signal detection unit 620 generates a reproducing signal based on a change in the current amount. Information recorded on the surface of the recording medium 500 can be read based on the reproducing signal.

An operation of recording information on the recording medium 500 will be described with reference to FIGS. 2 and 3. A positive (+) voltage or a negative (−) voltage, of which absolute values are equal to or greater than a threshold voltage, is applied to the writing electrode W of the electric field sensor 100. When the positive (+) voltage is applied to the writing electrode W, an electric domain of the recording medium 500 facing the writing electrode W is polarized in a first polarization direction, and a surface of the corresponding electric domain is negative (−). On the other hand, when a negative (−) voltage is applied to the writing electrode W, an electric domain of the recording medium 500 facing the writing electrode W is polarized in a second direction, and a surface of the corresponding electric domain is positive (+). Thus, according to the voltage applied to the writing electrode W, a polarization direction of an electric domain of the recording medium 500, which is ferroelectric, can be changed, and information can be recorded on the recording medium 500.

Figure 4:
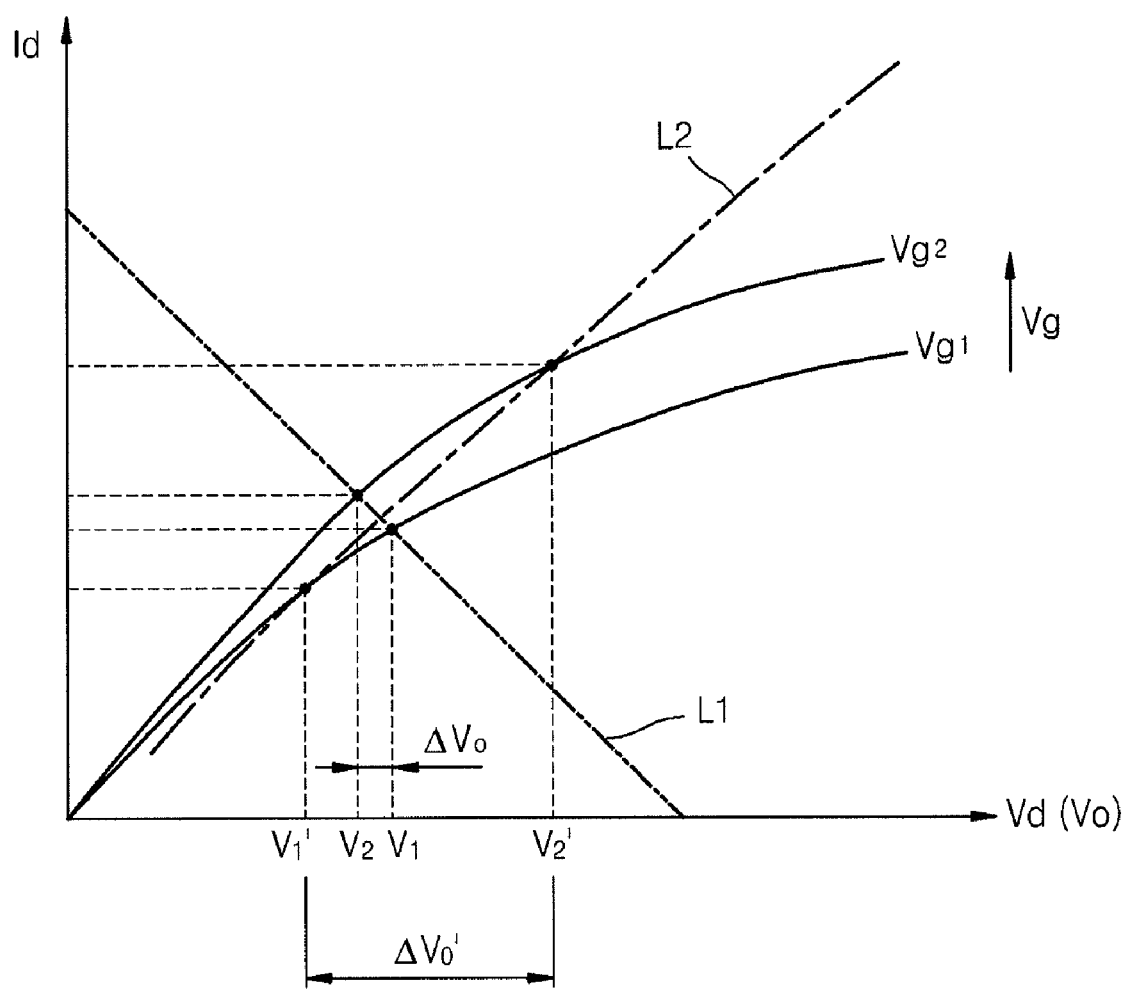
FIG. 4 is a graph of drain voltage versus drain current of an electric field sensor.
Figure 5:
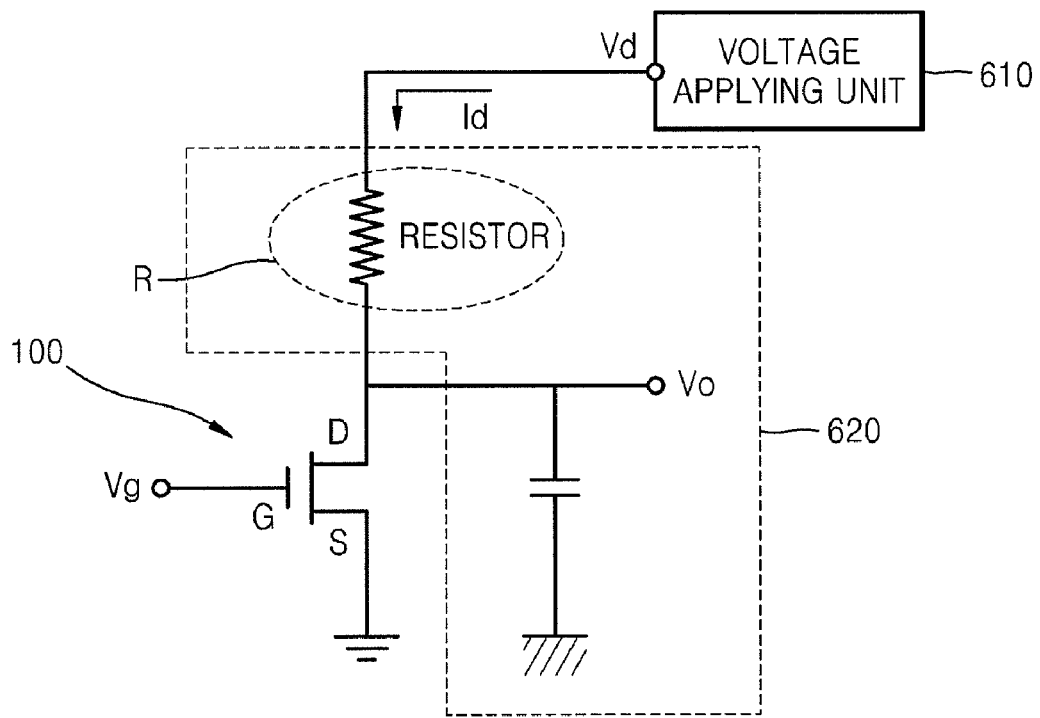
FIG. 5 is a structure view of a reproducing signal detection unit, according to an exemplary embodiment of the present invention.

FIG. 4 is a graph of drain voltage versus drain current of the electric field sensor 100. When a small variation of the drain current Id with respect to a surface voltage Vg of the recording medium 500 is directly read in a linear region of a curve of drain voltage versus drain current, sensitivity is very low. When the sensitivity is low, a detection signal is easily affected by noise. Thus, to improve the resolving power of the electric field sensor 100, high sensitivity should be ensured. For example, as illustrated in FIG. 5, the electric field sensor 100 can be designed as an electric field effect transistor (FET). FIG. 5 is a structural view of a reproducing signal detection unit, according to an exemplary embodiment of the present invention. To detect the variation of the drain current Id, a resistor R is installed in an electric circuit connecting the drain region D to the voltage applying unit 610. It is assumed that the resistor R is a positive resistor such that a load line L1 has a negative gradient in a graph of voltage versus current (see FIG. 4). In FIG. 4, when the surface voltage Vg of the recording medium 500 is Vg1 and Vg2, an output voltage Vo is V1 and V2, respectively, and the variation ΔVo of the output voltage Vo is a difference between V1 and V2. The greater the variation ΔVo of the output voltage Vo, the higher sensitivity. When the positive resistor is used as the resistor R, it is very difficult to increase the variation ΔVo of the output voltage Vo, as illustrated in FIG. 4. That is, since the variation of the drain current Id with respect to change in the surface voltage Vg of the recording medium 500 is very small, it is very difficult to increase the variation ΔVo of the output voltage Vo when the positive resistor is used as the resistor R.

According to an exemplary embodiment of the present invention, a negative resistor can be installed as the resistor R in the electric circuit connecting the drain region D to the voltage applying unit 610, and thus sensitivity is increased. Referring to FIG. 4, a load line L2 of the negative resistor has an opposite gradient to that of the load line L1 of the positive resistor. When the negative resistor is used as the resistor R, if the surface voltage Vg of the recording medium 500 is Vg1 and Vg2, the output voltage Vo is V1' and V2', respectively. Thus, it can be seen that the variation ΔVo of the output voltage Vo when the negative resistor is used as the resistor R is much greater than the variation ΔVo of the output voltage Vo when the positive resistor is used as the resistor R.

Hereinafter, a simulation result of sensitivity increase effects will be described when the negative resistor is used as the resistor R.

Figure 6:
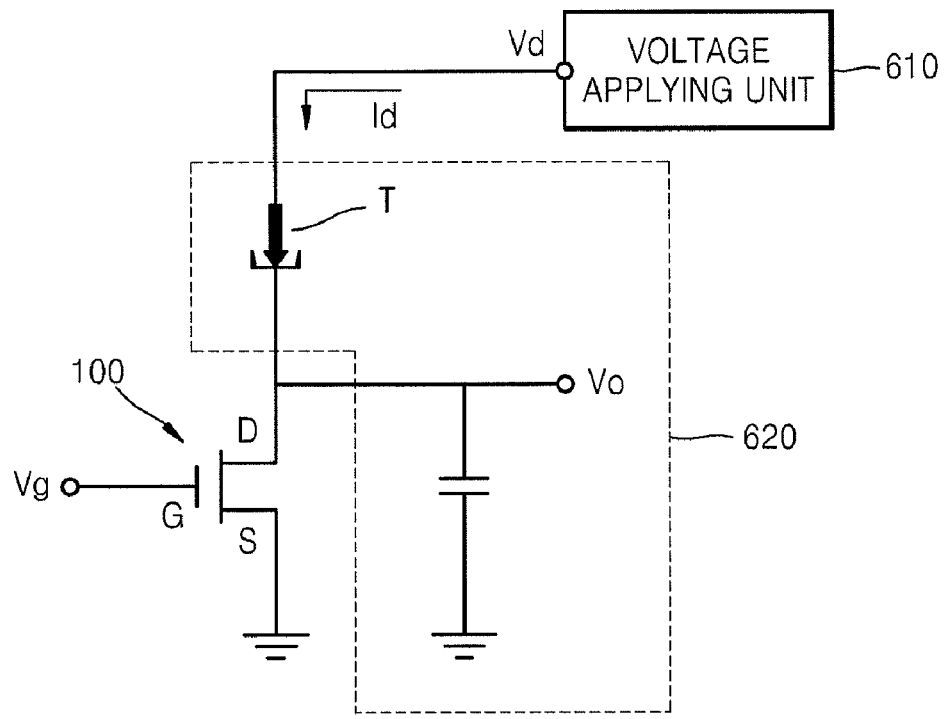
FIG. 6 is a structure view of a reproducing signal detection unit, in which a tunnel diode is used as a negative resistor, according to another exemplary embodiment of the present invention.
Figure 7:
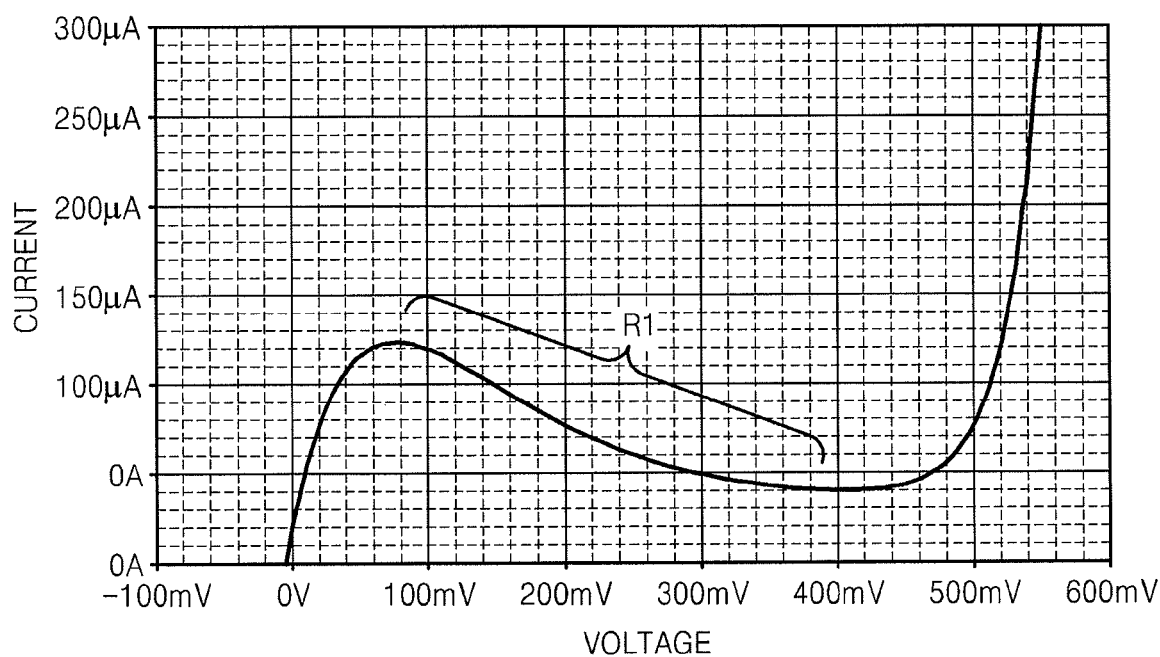
FIG. 7 is a graph of voltage versus current of a tunnel diode.

FIG. 6 is a structural view of a reproducing signal detection unit, in which a tunnel diode T is used as a negative resistor, according to another exemplary embodiment of the present invention. The tunnel diode T is a p-n junction diode in which the concentration of p and n dopants is increased so as to have a very narrow depletion layer. FIG. 7 is a graph of voltage versus current of a Si tunnel diode 1N2927 available from Microsemi Corp. Referring to FIG. 7, when a voltage increases, a current is reduced, in a region R1, which is a negative resistance region.

Figure 8:
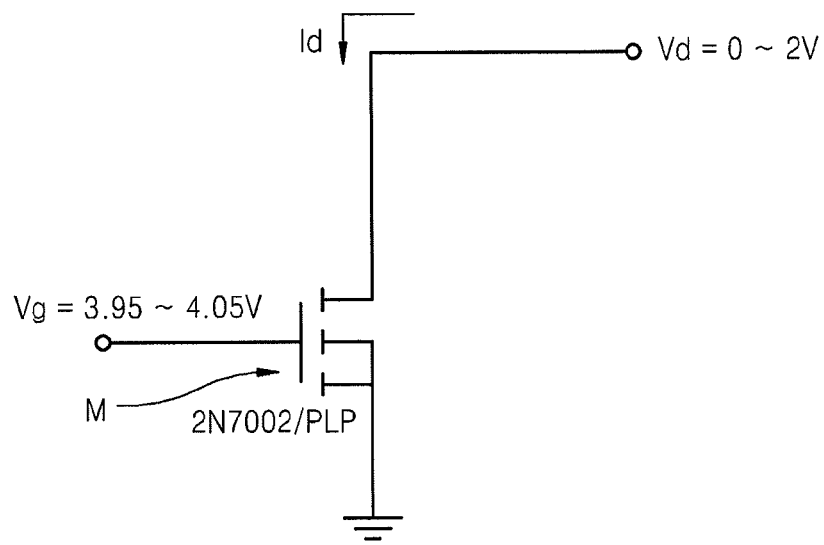
FIG. 8 is a circuit diagram of an electric field effect transistor M to obtain a relationship between drain voltage and drain current of the electric field effect transistor M, according to an exemplary embodiment of the present invention.

FIG. 8 is a circuit diagram to obtain a relationship between drain voltage and drain current of the electric field effect transistor M, according to an exemplary embodiment of the present invention. In FIG. 8, the electric field sensor 100 is replaced with the electric field effect transistor M in order to examine the effect of the reproducing signal detection unit 620 including the tunnel diode T.

Figure 9:
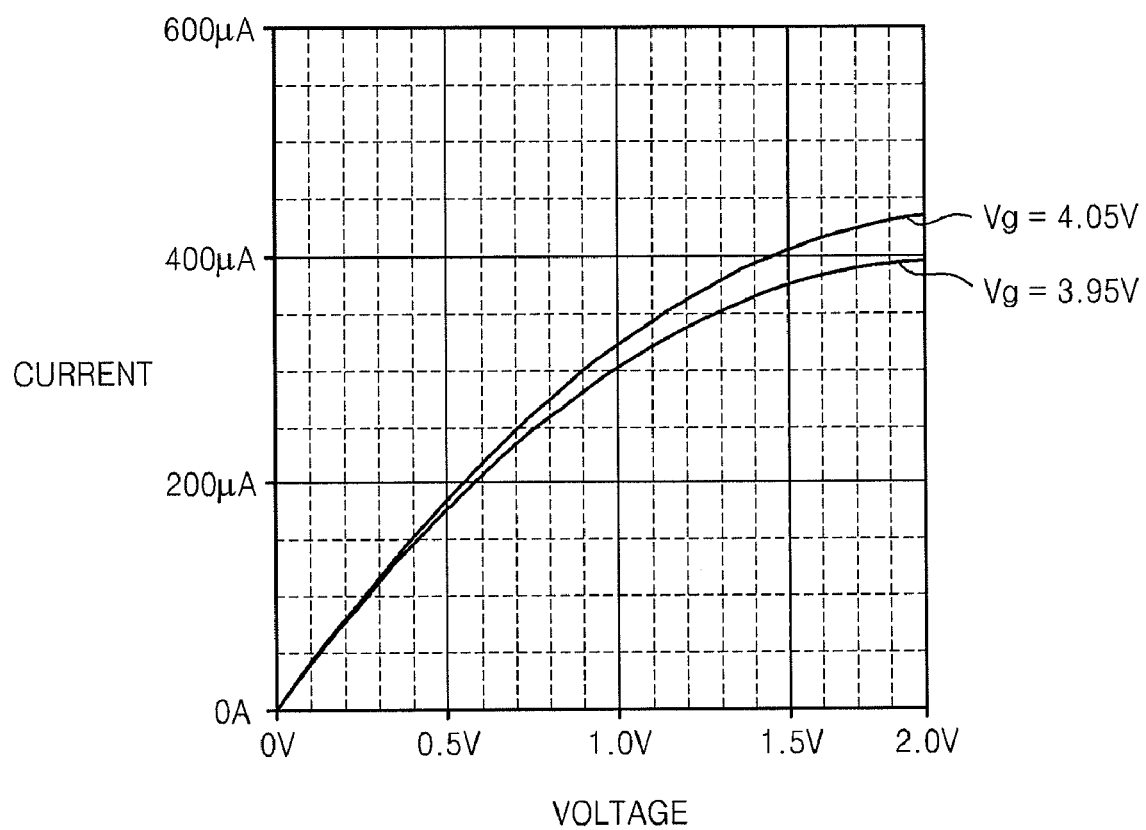
FIG. 9 is a graph of drain voltage versus drain current of the electric filed effect transistor M in the circuit diagram of FIG. 8.

In the circuit diagram, an n-channel vertical DMOSFET (2N7002/PLP) is used as the electric field effect transistor M. FIG. 9 is a graph of a drain current Id versus a drain voltage Vd as the drain voltage Vd is changed from 0 V to 2 V, and a voltage that is applied to a gate electrode Vg is 3.95V and 4.05V in the electric field effect transistor M of the circuit diagram of FIG. 8. The variation of the drain current Id is only about 40 μA while the voltage Vg is changed from 3.95 V to 4.05 V.

Figure 10:
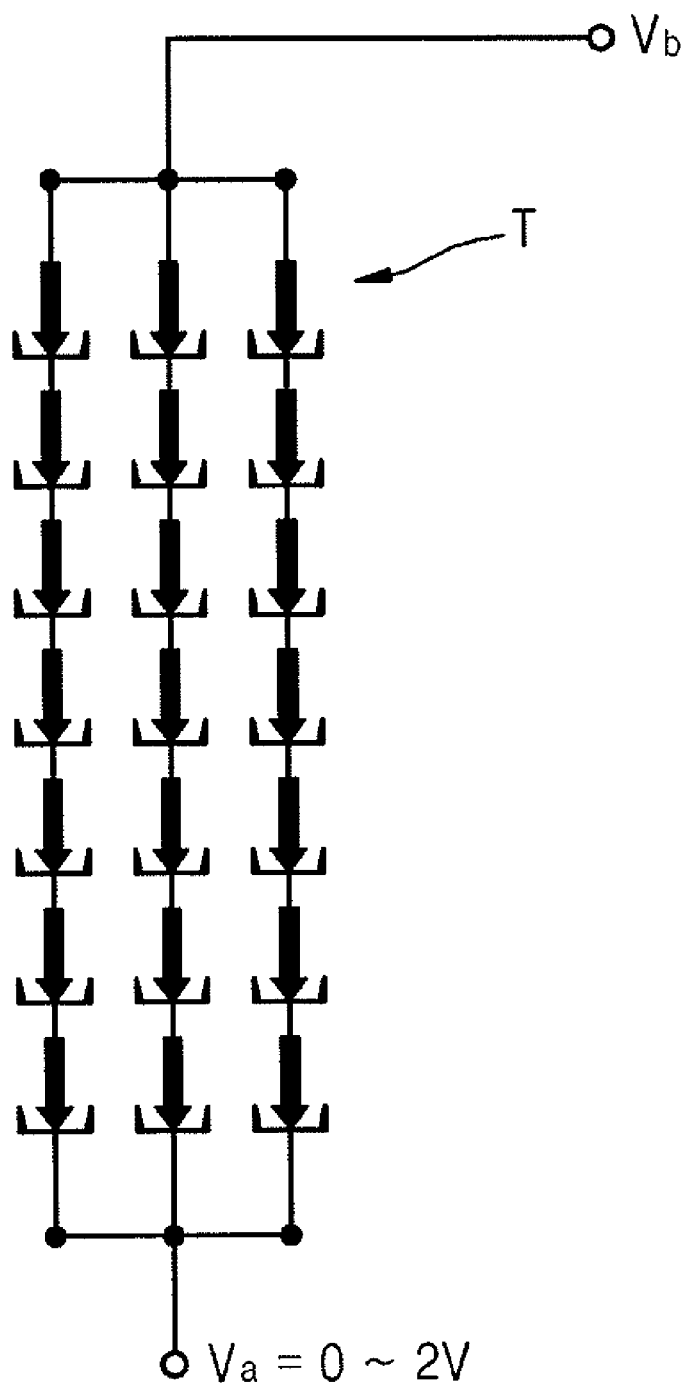
FIG. 10 is a circuit diagram for obtaining a load line of a tunnel diode, according to an exemplary embodiment of the present invention.

FIG. 10 is a circuit diagram for obtaining a load line of a negative resistor, according to an exemplary embodiment of the present invention. To improve sensitivity by increasing the variation ΔVo of the output voltage Vo, a negative resistance region of the load line of the negative resistor should cross the linear region of the electric field sensor 100. As a gradient of the negative resistor region of the load line of the negative resistor goes much similar to a gradient of the linear region of the curve of drain voltage versus drain current of the electric field sensor 100, the variation ΔVo of the output voltage Vo is increased, and the sensitivity is also improved. To achieve this, a plurality of negative resistors (e.g., a plurality of tunnel diodes T), which are connected in series and/or in parallel, can be used. When the tunnel diodes T are connected in series, the gradient of the load line of the negative resistance region is gentle. When the tunnel diodes T are connected in parallel, the gradient of the load line of the negative resistance region is steep.

In the circuit diagram, twenty-one Si tunnel diodes 1N2927, available from Microsemi Corp., are used as the tunnel diodes T such that a linear region of the curve of drain voltage versus drain current of a 2N7002/PLP(n-channel vertical DMOSFET) and a negative resistance region of a load line of a negative resistor cross each other.

Figure 11:
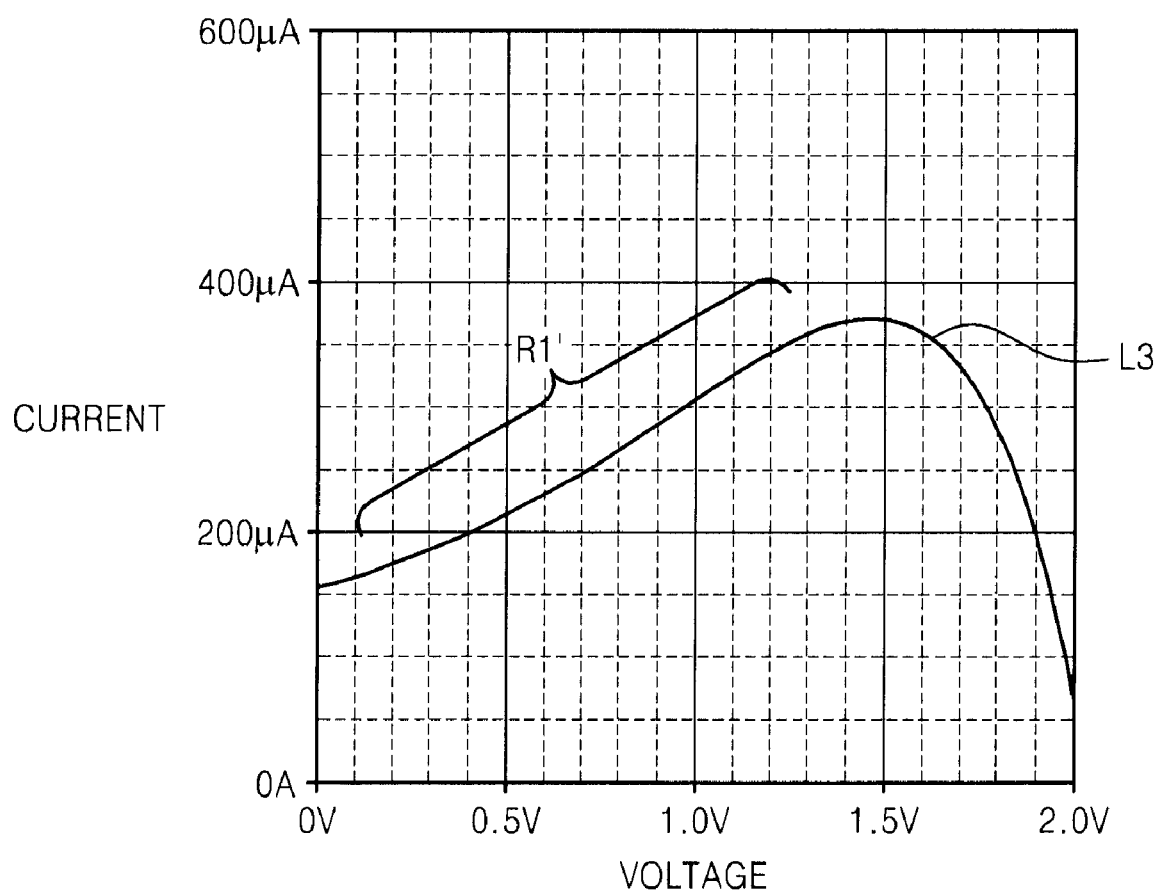
FIG. 11 is graph of a load line of a tunnel diode simulated by the circuit diagram of FIG. 8.

FIG. 11 is graph of drain voltage versus drain current obtained from the circuit of FIG. 10, so as to illustrate a load line L3 obtained by sweeping a voltage Va from 0 V to 2 V and maintaining a voltage Vb as 2 V, according to an exemplary embodiment of the present invention. Compared with FIG. 4, a region R1' of the load line L3 of FIG. 11 has the same shape as the load line L2 of FIG. 4.

Figure 12:
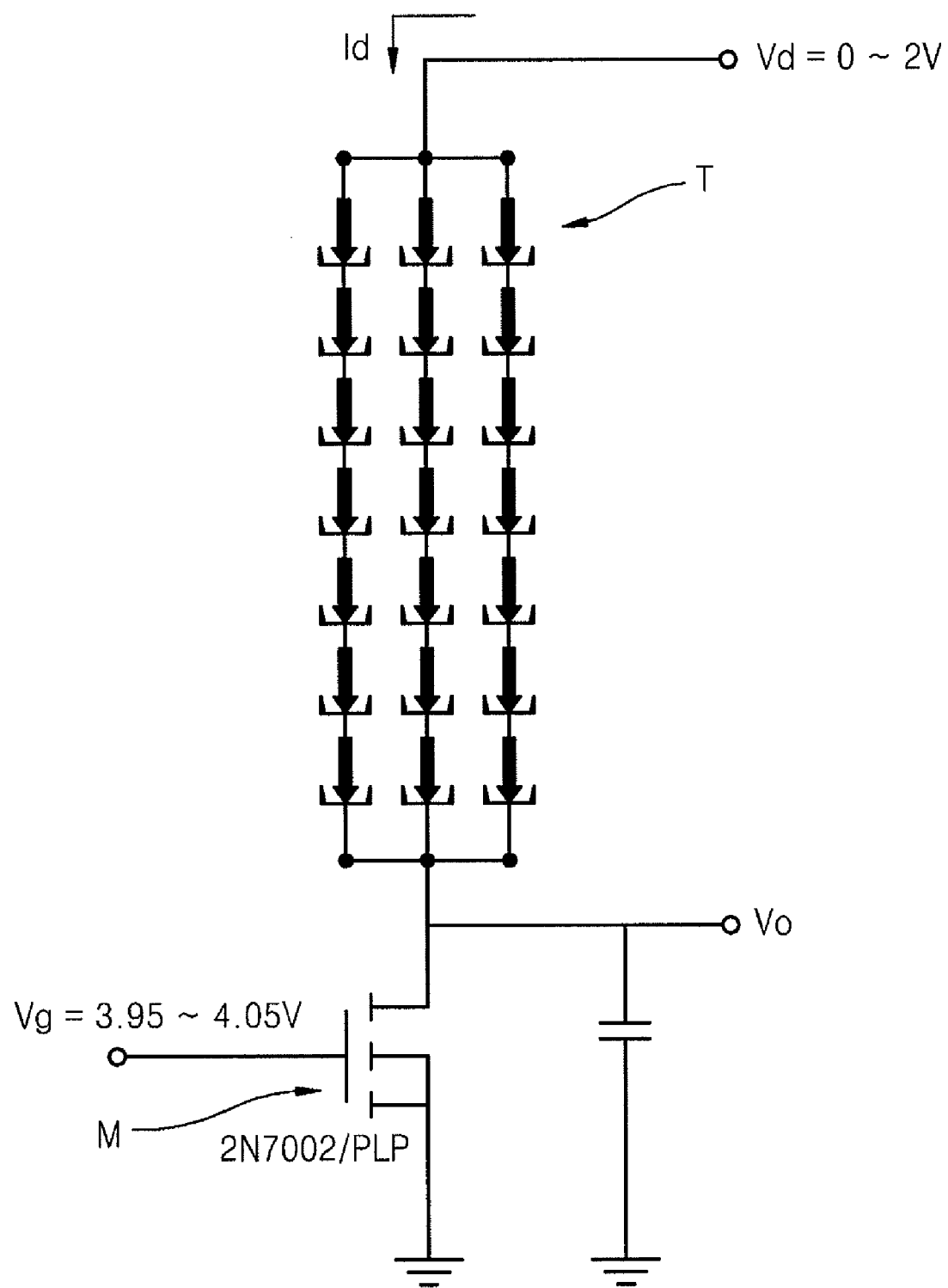
FIG. 12 is a circuit diagram, in which the circuits of FIGS. 8 and 10 are synthesized, according to an exemplary embodiment of the present invention.
Figure 13:
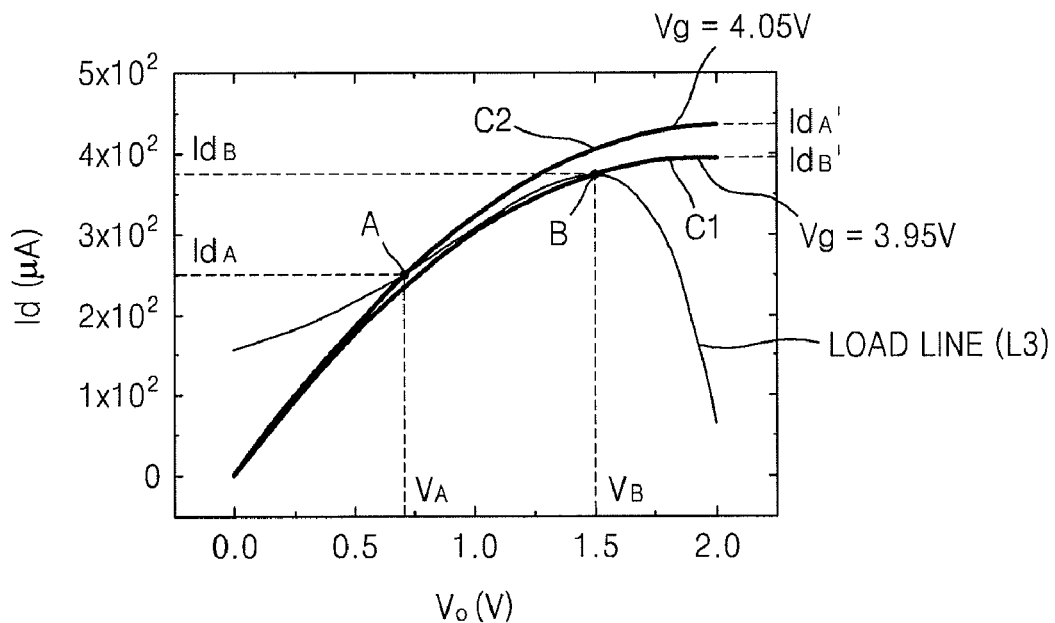
FIG. 13 is a graph, in which the graphs of FIGS. 9 and 11 are synthesized.
Figure 14:
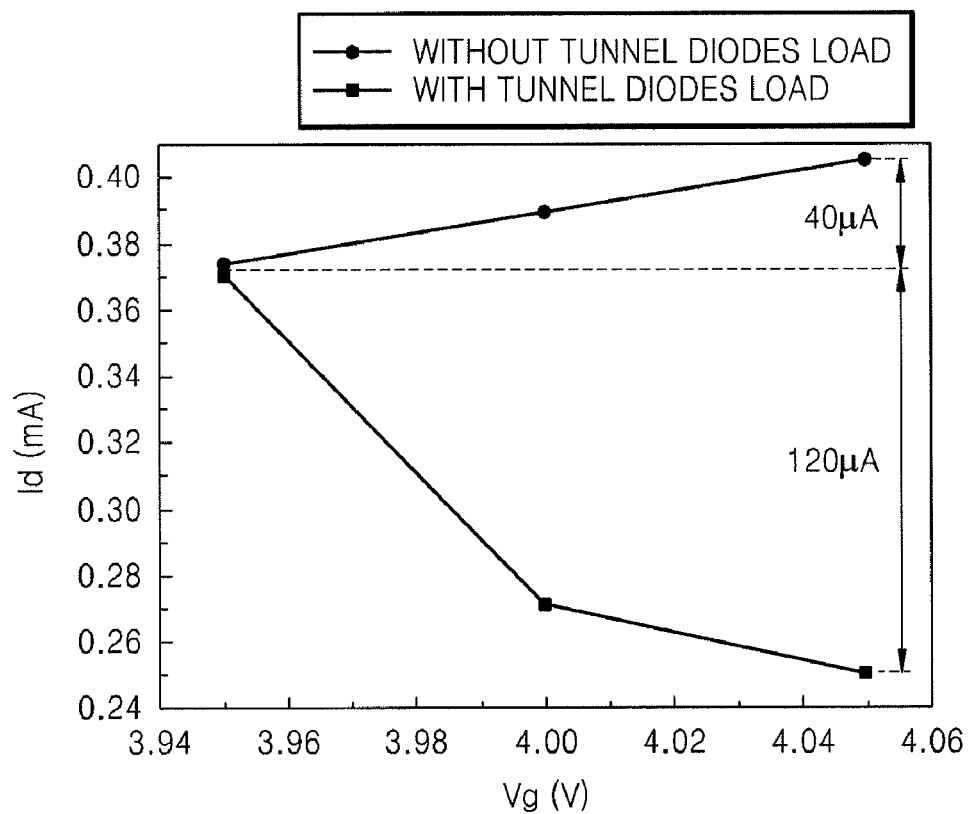
FIG. 14 is a graph of voltage Vg versus drain current Id.

FIG. 12 is a circuit diagram in which the circuits of FIGS. 8 and 10 are combined, according to an exemplary embodiment of the present invention. Referring to FIG. 12, when an amount of current flowing in the electric field effect transistor M is the same amount of current flowing in the tunnel diode T with respect to the voltage Vg, the amount of current is an operating amount of current. FIG. 13 is a graph including the plots of FIGS. 9 and 11. Referring to FIG. 13, when the voltage Vg is 4.05 V, a curve C2 and the load line L3 of the tunnel diode T cross each other at an operating point A. When the voltage Vg is 3.95 V, a curve C1 and the load line L3 of the tunnel diode T cross each other at an operating point B. When the voltage Vg is changed from 3.95 V to 4.05 V, the variation ΔVo of the output voltage Vo is VB-VA, and the variation ΔId of the drain current Id is IdB-IdA. When the tunnel diode T is not used, a maximum value of the variation ΔId of the drain current Id, which can be detected when the voltage Vg is changed from 3.95 V to 4.05 V, is only a difference between IdA' and IdB'. FIG. 14 is a graph of voltage Vg versus drain current Id. Referring to FIG. 14, according to reproducing signal detection unit 620 including the tunnel diode T, when the voltage Vg is changed from 3.95 V to 4.05 V, the variation ΔId of the drain current Id is about 120 μA. On the other hand, when the tunnel diode T is not used, a maximum value of the variation ΔId of the drain current Id, which can be detected when the voltage Vg is changed from 3.95 V to 4.05 V, is about 40 μA. Therefore, according to the reproducing signal detection unit 620 including the tunnel diode T, the sensitivity can be nearly trebled.

As described above, an electric field effect transistor is used instead of the electric field sensor 100. However, since the electric field sensor 100 can be designed as the electric field effect transistor, it is understood by one of ordinary skill in the art that such design improves the sensitivity of the electric field sensor 100.

In addition, as described above, twenty-one Si tunnel diodes 1N2927, available from Microsemi Corp., are used according to the curve of drain voltage versus drain current of the n-channel vertical DMOSFET (2N7002/PLP), however this is exemplary. It is understood by one of ordinary skill in the art that a plurality of negative resistors can be connected in series and/or in parallel so that a load line may cross a voltage Vd versus current Id curve of the electric field sensor 100a, as illustrated in FIG. 1 or the linear region of the curve of drain voltage versus drain current of the electric field sensor 100b, as illustrated in FIG. 2, and the negative resistance region of the load line may have a similar gradient to the gradient of the linear region of the curve of drain voltage versus drain current.

As described above, by using the reproducing signal detection unit 620 including the negative resistor, the sensitivity of the electric field sensor 100 can be improved. The reproducing signal detection unit 620 may further include an amplifier amplifying the output voltage Vo and an analog-digital converter for converting an amplified signal into a digital signal. A process of processing a reproducing signal of which an output voltage Vo can be detected by an information processing apparatus, such as a computer, is well known to one of ordinary skill in the art, and thus its detailed description will be omitted. For example, a signal processing structure of a conventional hard disk drive (HDD) can be used.

According to a method of increasing the sensitivity of an electric field sensor according to an exemplary embodiment of the present invention, since a small variation of intensity of an electric field applied to a resistance region can be sensed at a very high sensitivity, effects due to noise can be reduced. In addition, according to a storage apparatus and a reproducing method of the storage apparatus, a very high read sensitivity can be obtained.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of improving the sensitivity of an electric held sensor comprising a source region, a drain region and a resistance region electrically connecting the source region to the drain region and having a resistance, which varies according to an intensity of an electric field, and detecting a change in the electric field by measuring a change in a drain current flowing through the resistance region, the measuring the change in the drain current comprises:

passing the drain current through at least one negative resistor; and detecting a change in a voltage between the drain region and the at least one negative resistor.

2. The method of claim 1, further comprising utilizing a tunnel diode as the at least one negative resistor.

3. The method of claim 1, further comprising utilizing a plurality of tunnel diodes, which are connected in series and/or parallel, as negative resistors.

4. The method of claim 3, wherein the plurality of tunnel diodes are connected in series and/or in parallel so that a negative resistance region of a load line of the tunnel diodes has a similar gradient to a gradient of a linear region of a curve of drain current with respect to a drain voltage of the electric field sensor, and the negative resistance region and the linear region cross each other.

5. A storage apparatus comprising:
a ferroelectric recording medium;
an electric field sensor including a source region, a drain region and a resistance region, which electrically connects the source region to the drain region and has a resistance which varies according to intensity of an electric field due to a polarization voltage of an electric domain of the ferroelectric recording medium;
a voltage applying unit applying a drain voltage between the source region and the drain region; and
a reproducing signal detection unit including at least one negative resistor installed in an electric circuit connecting the drain region to the voltage applying unit, and detecting a change in a voltage between the drain region and the at least one negative resistor.

6. The storage apparatus of claim 5, wherein the negative resistor is a tunnel diode.

7. The storage apparatus of claim 6, wherein the reproducing signal detection unit comprises a plurality of tunnel diodes connected in series and/or in parallel.

8. The storage apparatus of claim 7, wherein the tunnel diodes are connected in series and/or in parallel so that a negative resistance region of a load line of the tunnel diodes has a similar gradient to a gradient of a linear region of a curve of drain current with respect to the drain voltage of the electric field sensor, and the negative resistance region and the linear region cross each other.

9. The storage apparatus of claim 5, wherein the electric field sensor further comprises a writing electrode which is disposed on the resistance region, and to which a voltage, of which the absolute value is equal to or greater than a threshold voltage, is applied to record information on the ferroelectric recording medium, and wherein an insulating layer is disposed between the writing electrode and the resistance region.

10. A method of reproducing information of a storage apparatus, the storage apparatus comprising: a ferroelectric recording medium; an electric field sensor including a source region, a drain region and a resistance region electrically connecting the source region to the drain region and having a resistance, which varies according to an intensity of an electric field due to a polarization voltage of an electric domain of the recording medium; and a voltage applying unit applying a drain voltage between the source region and the drain region, wherein the method comprises:
installing at least one negative resistor in an electric circuit connecting the drain region to the voltage applying unit to pass an output current of the electric field sensor through the at least one negative resistor; and
detecting a change in a voltage between the drain region and the at least one negative resistor to obtain a reproducing signal.

11. The method of claim 10, wherein a plurality of tunnel diodes, which are connected in series and/or parallel, are used as negative resistors.

12. The method of claim 11, wherein the tunnel diodes are connected in series and/or in parallel so that a negative resistance region of a load line of the tunnel diodes has a similar gradient to a gradient of a linear region of a curve of drain current with respect to the drain voltage of the electric field sensor, and the negative resistance region and the linear region cross each other.

* * * * *